United States Patent [19]
Yoo

[11] Patent Number: 5,434,700
[45] Date of Patent: Jul. 18, 1995

[54] ALL-OPTICAL WAVELENGTH CONVERTER
[75] Inventor: Sung-Joo Yoo, Shrewsbury, N.J.
[73] Assignee: Bell Communications Research, Inc., Livingston, N.J.
[21] Appl. No.: 168,565
[22] Filed: Dec. 16, 1993
[51] Int. Cl.$^6$ .............................................. G02F 1/39
[52] U.S. Cl. .................................... 359/332; 372/22; 385/122
[58] Field of Search ............... 385/122; 372/21-23; 359/326, 328, 329, 332

[56] References Cited

U.S. PATENT DOCUMENTS

| | | | |
|---|---|---|---|
| 5,002,349 | 3/1991 | Cheung et al. | 385/1 |
| 5,061,028 | 10/1991 | Khanarian et al. | 359/332 X |
| 5,206,868 | 4/1993 | Deacon | 372/21 |
| 5,207,864 | 5/1993 | Bhat et al. | 156/633 |
| 5,247,601 | 9/1993 | Myers et al. | 385/122 |
| 5,289,309 | 2/1994 | Delacourt et al. | 359/328 |

OTHER PUBLICATIONS

Inoue, "Wavelength Conversion for Frequency-Modulated Light Using Optical Modulation to Oscillation Frequency of a DFB Laser Diode," in *Journal of Lightwave Technology*, vol. 8, Jun. 1990, pp. 906–911.
Xu et al., "Wavelength conversions ~1.5 μm by difference frequency generation in periodically domain-inverted LiNbO3 channel waveguides," *Applied Physics Letters*, vol. 63, pp. 1170–1172 (Aug. 1993).
Yoo et al., "Second-order susceptibility in asymmetric quantum wells and its control by proton bombardment," *Applied Physics Letters*, vol. 58, Apr. 1991, pp. 1724–1726.
Hermann et al., "Difference-frequency generation of tunable, coherent mid-infrared radiation in Ti:LiNbO3 channel waveguides," *Journal Optical Society of America B*, vol. 5, Feb. 1988, pp. 278–284.
Lim et al., "Infrared radiation generated by quasi-phase-matched difference-frequency mixing in a periodically poled lithium niobate waveguide," *Applied Physics Letters*, vol. 59, Oct. 1991, pp. 2207–2209.
Uesugi, "Parametric difference frequency generation in a three-dimensional LiNbO3 optical waveguide," *Applied Physics Letters*, vol. 36, Feb. 1980, pp. 178–180.
Wong, "Integrated optical waveguides and devices fabricated by proton exchange: a review," *Integrated Optical Circuit Engineering VI*, SPIE vol. 993, 1988, pp. 13–25.
Yamamoto et al., "Characteristics of periodically domain-inverted LiNbO3 and LiTaO3 waveguides for second harmonic generation," *Applied Physics*, vol. 70, Aug. 1991, pp. 1947–1951.
Yamamoto et al., "Milliwatt-order blue-light generation in a periodically domain-inverted LiTaO3 waveguide," *Optics Letters*, vol. 16, Aug. 1991, pp. 1156–1158.
Sohler et al., "Optical parametric amplification in Ti-diffused LiNbO3 waveguides", *Applied Physics Letters*, Aug. 1980, pp. 255–257, vol. 37.
Matsumoto et al., "Quasiphase-matched second harmonic generation of blue light in electrically periodically-poled lithium tantalate waveguides," *Electronics Letters*, vol. 27, Oct. 1991, pp. 2040–2041.
Mizuuchi et al., "Second-harmonic generation of blue light in a LiTaO3 waveguide", *Applied Physics Letters*, vol. 58, Jun. 1991, pp. 2732–2734.

*Primary Examiner*—John D. Lee
*Attorney, Agent, or Firm*—Leonard Charles Suchyta; James W. Falk

[57] ABSTRACT

An all-optical wavelength converter comprising an optical waveguide of regions having differing non-linear optical susceptibilities such that the regions are quasi phase matched. An optical pumping signal is introduced in the waveguide, either input from the outside or is locally generated from a lasing active layer in the waveguide. Light having a first frequency is input to the waveguide and interacts with the optical pumping signal via the non-linear susceptibility to create light having a second frequency. Each of the regions has a length of one coherence length. That is, the input light and the pump light fall out of phase by 180° in one coherence length. The modulation of the non-linear susceptibility can be accomplished, by disordering the anisotropic material forming the non-linear waveguide, by inverting the anisotropic crystal structure, or by launching an acoustic wave onto the waveguide so that the compression of the material periodically varies the non-linearities. Semiconductor quorum wells provide a high degree of non-linearity, but lithium niobate and related materials can also be used.

15 Claims, 11 Drawing Sheets

ALL-OPTICAL WAVELENGTH CONVERTER

FIELD OF THE INVENTION

In general, the invention relates to opto-electronic devices. In particular, the invention relates to non-linear optical devices, preferably made from III–V semiconductors or metal-oxide perovskites, that convert the wavelength of an optical signal to a wavelength of another value.

BACKGROUND ART

A need has recently arisen for a device that converts an optical signal from one frequency to another. This need exists in the field of communication networks utilizing wavelength-division multiplexing (WDM). In such a network, a data signal is impressed upon one optical carrier frequency, and it is desired to thereafter convert the so impressed optical carrier frequency to another optical carrier frequency. Several WDM architectures are, possible. One schematically illustrated in FIG. 1 includes a number of small-area WDM networks 12 interconnected by a long-distance WDM backbone 14. Multiple optical carriers having respective wavelengths $\lambda_1, \lambda_2, \ldots \lambda_N$ are impressed on single optical fibers interconnecting respective nodes within each of the small-area networks 12, where N is the number of optical carriers and where the number of nodes is generally of order N. Each node is assigned one optical carrier of wavelength $\lambda_i$ on which to receive signals, but each node can selectively transmit signals on any of the wavelengths $\lambda_1, \lambda_2, \ldots \lambda_N$. As a result, signals can be routed through the small-area networks 12 according simply to their respective carrier wavelengths $\lambda_i$. This architecture has become advantageous because suitable components have been recently developed which can switch the optical signals according to their optical frequencies without the need for converting them to electrical form.

Figure 1:
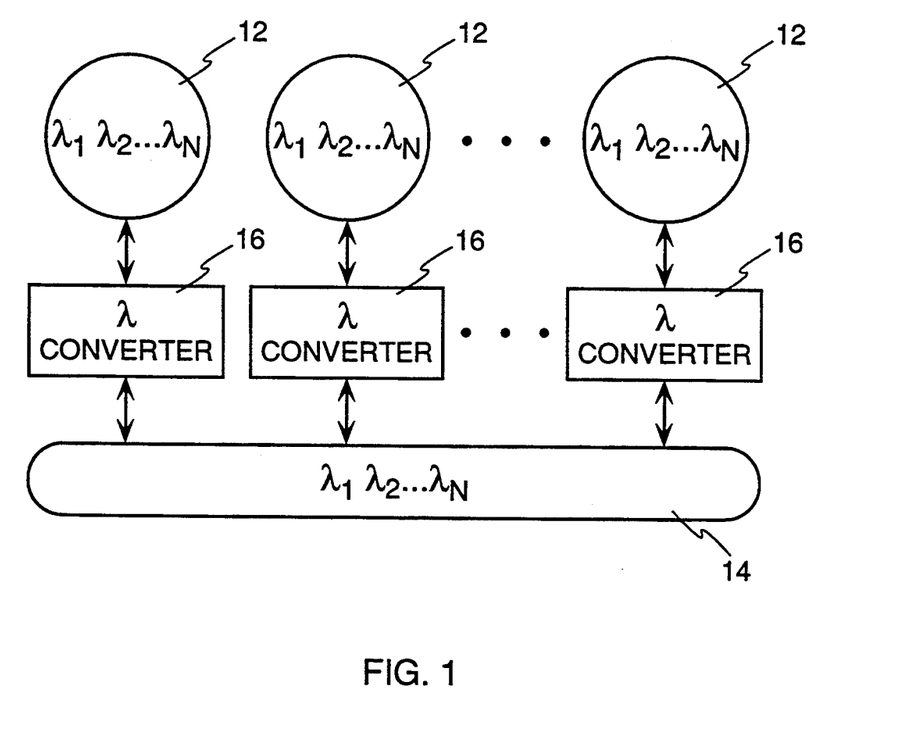
FIG. 1 is a block diagram of one type of wavelength-division multiplexing system to which the wavelength converter of the invention is advantageously applied.

For a number of reasons including limited bandwidth of optical amplifiers and laser frequency jitter, realistically sized systems will require that the small-area networks 12 and the backbone 14 reuse the same N carrier wavelengths $\lambda_1, \lambda_2, \ldots \lambda_N$, where N is of the order of 10 to 40. Then, in order that any one small-area network 12 be connectable to any other, an optical signal transmitted between a small-area network 12 and the backbone 14 will require a wavelength converter 16 at the interface between them to change the carrier frequency. Such wavelength shifts can be accomplished by demodulating the incoming optical carrier to produce an electrical data signal and then modulating the outgoing optical carrier with the electrical data signal. However, an all-optical wavelength converter not requiring conversion to electrical form is greatly desired. Inoue has disclosed such an all-optical converter using a Mach-Zehnder filter in "Wavelength Conversion for Frequency-Modulated Light Using Optical Modulation to Oscillation Frequency of a DFB Laser Diode," in *Journal of Lightwave Technology*, vol. 8, 1990, pp. 906–911; but, this converter is bulky and fragile. To date, a practical form of such an all-optical wavelength converter has not been found.

SUMMARY OF THE INVENTION

The invention can be summarized as an all-optical wavelength converter in which light is waveguided through a linear series of asymmetric regions of non-linear susceptibility which quasi-phase match the signal light being converted and the pumping light. The non-linear susceptibility of the material of the waveguide causes the structure to act as an optical mixer. In order to achieve a long interaction length and thus a high conversion efficiency, the asymmetric quantum wells are quasi phase matched between the pump frequency and the signal frequencies. That is, the asymmetry is arranged so that the phases of the respective signals in the different regions are such that more power is transferred to the output signal than is removed from it. Without quasi phase matching, the pump signal and the data signals quickly fall out of phase because of the different refractive indices at the significantly different frequencies and the wrong phases cause power to be transferred in the wrong direction.

The quasi phase matching assures that on average energy is being transferred from the input signal to the output signal and not vice versa. That is, even though the signals fall out of phase over the asymmetric series, the local sign or magnitude of the non-linearity is such that on average power is transferred from the input signal to the output signal.

The asymmetric series may be accomplished in a number of ways. Among other possibilities, (1) a transducer may launch an acoustic wave into a non-linear, piezo-optical material, (2) the elements may have different non-linear crystalline orientations, (3) alternate elements may have a non-linear crystalline structure and a disordered isotropic structure respectively, or (4) the different regions may be electrically biased in opposite directions. Advantageously, at least some of the elements include semiconductor quantum wells that are highly optically non-linear. Even more advantageously, the quantum wells optically amplify the pump signal so as to lase at that frequency and thus provide the pump signal. Otherwise the high-power optical pump signal is input co-linearly with the optical carrier to non-linearly interact with the optical carrier.

BRIEF DESCRIPTION OF THE DRAWINGS

FIGS. 6A, B and 7–9 are cross-sectional views of a method of fabricating a waveguide with a longitudinal series of inverted crystallographic domains.

DETAILED DESCRIPTION OF THE PREFERRED EMBODIMENTS

Figure 2:
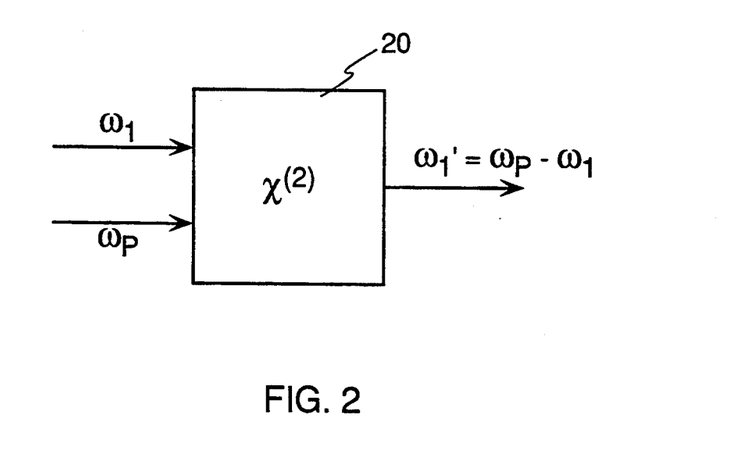
FIG. 2 illustrates the operation of an optical mixer according to which the invention operates.
Figure 3:
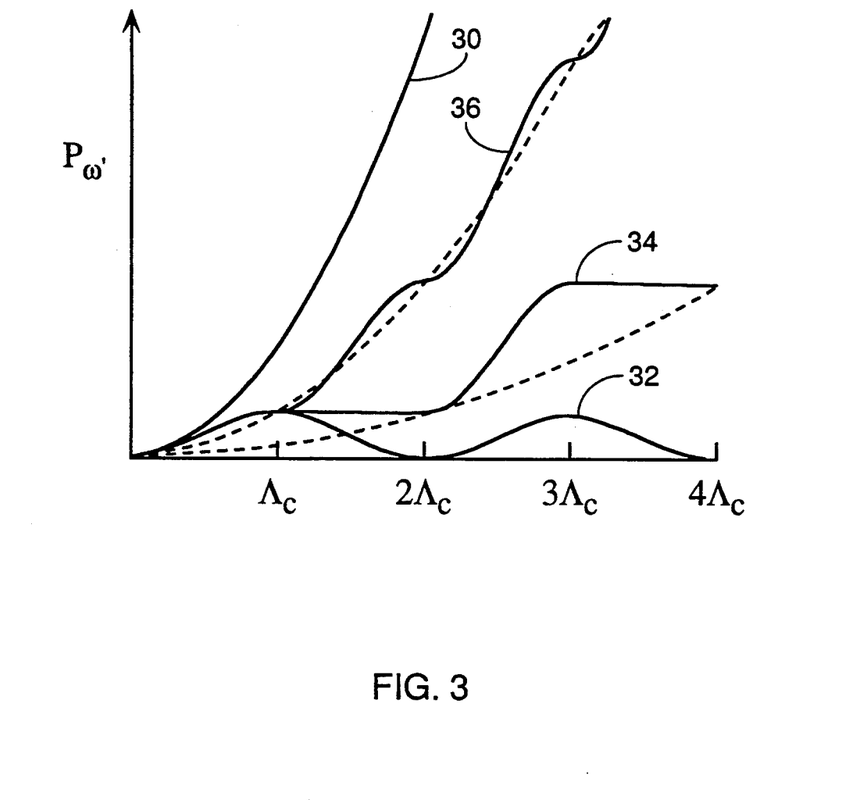
FIG. 3 is plot of power generation in non-linear wavelength conversion as a function of propagation length for a number of phase conditions.

The invention is based upon the concept of optical mixers. As illustrated in FIG. 2, an input data signal at frequency $\omega_1$ is applied to a non-linear optical element 20. A large optical pump signal at frequency $\omega_P$ is also applied to the non-linear element 20. Because of the second-order non-linear susceptibility $\chi^{(2)}$, a number of signals at other frequencies are output including one at the frequency $$\omega_1' = \omega_P - \omega_1 \tag{1}$$

which defines the conservation of energy. Thereby, the optical mixer converts the signal at $\omega_1$ to a signal at $\omega'_1$. The optimal but seldom obtained behavior is illustrated by curve 30 of FIG. 3 which shows the growth of the power $P_{\omega'_1}$ of the generated carrier wave at $\omega'_1$. Curve 30 represents the ideal case of birefringent phase-matching that achieves matching of phase, $\Delta k=0$, where $\Delta k$ is defined below.

However, an optical mixer has problems when used as a converter in which a high conversion efficiency is desired. The pump frequency needed to convert closely spaced communication channels has a substantially different frequency than the frequencies of the communication channels. For example, a channel shift of 20 nm for optical carriers at 1.53 μm can be obtained by a pump wavelength of 0.77 μm. The small optical non-linearities found in most materials dictate a relatively long interaction region if high conversion efficiency is desired. However, the widely differing frequencies result in the pump and data signals having significantly different dielectric constants in materials with usable non-linear components of the dielectric constant. As a result, the pump signal and the carrier signals quickly fall out of phase along the interaction region. The distance over which the two frequencies fall out of phase by $\pi$ is referred to as the coherence length $\Lambda_c$, which is given by $$\Lambda_c = \frac{\pi}{\Delta k} \tag{2}$$

where $$\Delta k = 2\pi \left( \frac{n_p}{\lambda_p} - \frac{n_1}{\lambda_1} - \frac{n'_1}{\lambda'_1} \right) \tag{3}$$

and where $\eta$ and $\lambda$ are the refractive index and the wavelength at the pump, input, and output frequencies respectively, where the wavelengths and frequencies are related by $\omega=2\pi c/\lambda$, and where c is the speed of light.

In this model, the power transferred to the other carrier frequency is given by $$\frac{P_{\omega'}}{P_\omega} = \frac{\omega'^2 |\chi^{(2)}|^2 P_{\omega p}}{2c^2 \epsilon_0 n^3 A_{eff}} \operatorname{sinc}^2 \left( \frac{y \cdot \Delta k}{2} \right), \tag{4}$$

where $\epsilon_0$ is the vacuum permittivity, $\eta$ is the geometric average of the respective refractive indices of the waveguide at the input, pump and generated frequencies, and y is the distance along which the waves are co-linearly propagating. The effective area $A_{eff}$ is defined in terms of the overlap integral of the normalized modes of the three wave functions about the waveguide.

Optical non-linearities are almost always so small that for a reasonable conversion efficiency the coherence length $\Lambda_c$ is much less than the required total interaction length. Therefore, the waves fall out of phase and energy is transferred not only from the pump signal to the output signal but also in the opposite direction. As a result, as illustrated by curve 32, relatively little optical power is converted from the pump signal to the output signal before the output signal begins giving that energy back to the pump signal.

The invention relies upon quasi phase matching. For quasi phase matching, the spatial period of the modulation of the optical non-linearity is matched to compensate for the phase mismatch, that is, $$\Delta k \pm K_{gr} = 0 \tag{5}$$

where $K_{gr}$ is the wavevector of the spatial modulation of the non-linear grating. That is, $K_{gr}=2\pi/L$, where L is the spatial period of the modulation, which is twice the coherence length $\Lambda_c$. This equation defines the conservation of momentum. For the quasi phase matching condition, these various quantities are related by $$\frac{1}{L} = \frac{K_{gr}}{2\pi} = \frac{n_{\omega p}}{\lambda_p} - \frac{n_{\omega 1}}{\lambda_1} - \frac{n_{\omega'1}}{\lambda'_1} = \frac{1}{2\Lambda_c}. \tag{6}$$

Since the coherence lengths are typically on the order of micrometers, and waveguides need to be a few millimeters long to achieve substantial non-linear conversion, the oscillations that occur every coherence length, if properly coordinated over the total interaction length, can be ignored, and only the average behavior of the difference frequency power need be considered. For this purpose, set $\Delta k=0$, and replace $\chi^{(2)}$ with $\sqrt{2} \cdot \chi^{(2)}/\pi$ to obtain $$\frac{P_{\omega'}}{P_\omega} = \frac{\omega'^2 |\chi^{(2)}|^2 \gamma^2 P_{\omega p}}{\pi^2 c^2 \epsilon_0 n^3 A_{eff}} \quad (7)$$

In one type of quasi phase matching, illustrated by curve 34, the magnitude of the non-linearity is periodically changed. As illustrated, after one coherence length during which the output wave reaches the maximum power, the non-linearity is reduced, preferably to zero as illustrated, for another coherence length that allows the interacting waves to come back into phase. Thereafter, the non-linearity returns to its high value, and the structure is periodically continued down the propagation length to further increase the power that the pump signal delivers to the output wave.

In a second type of quasi phase matching, as illustrated by curve 36, the sign of the non-linearity is reversed after every coherence length $\Lambda_c$. Xu et al. have reported such quasi phase matching in "Wavelength conversion ~1.5 µm by difference frequency generation in periodically domain-inverted LiNbO$_3$ channel waveguides," *Applied Physics Letters*, vol. 63, pp. 1170–1172. However, the reported conversion efficiencies are disappointingly low, far below what are estimated.

The two types of quasi phase matching may be commonly characterized as a linear modulation of the bipolar non-linear susceptibility with a half period equal to the coherence length. The DC component of the non-linearity's modulation is not being used for useful wavelength conversion.

Figure 4:
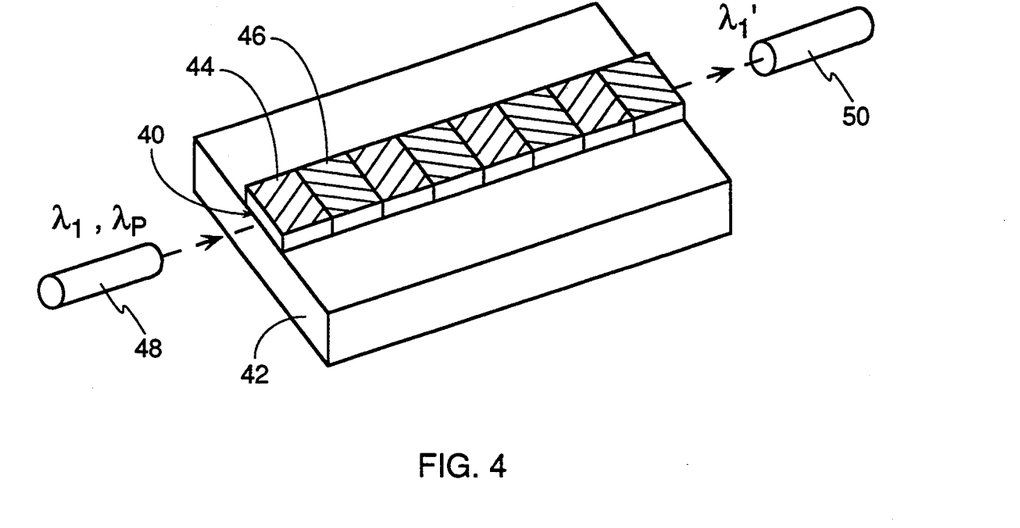
FIG. 4 is an isometric illustration of an embodiment of the wavelength converter of the invention using a semiconductor ridge waveguide with periodic domains.

The general structure of an embodiment of the invention is illustrated isometrically in FIG. 4. A ridge optical waveguide 40 is formed in a substrate 42 and includes alternating pairs of first and second sections 44 and 46. The exact form of the ridge waveguide 40 and of the first and second sections 44 and 46 will be described later for the different detailed embodiments; but, in general, the two sections 44 and 46 form an asymmetric structure such that one section compensates or alleviates the differential non-linear energy transfer of the other section. Each section is one coherence-length long so that the pump and data signals change relative phase by x across the section. An input optical fiber 48 inputs to the input facet of the waveguide 40 both the optical data carrier at wavelength $\lambda_1$ and the pump signal at wavelength $\lambda_P$. An output optical fiber 50 receives from the output facet of the waveguide 40 the converted optical data carrier at wavelength $\lambda'_1$ with the same data modulated upon it as was modulated on the input signal at $\lambda_1$.

An example follows of the non-linear interactions involved in the invention for a particularly advantageous class of materials, the zinc-blende compound semiconductors such as AlGaAs and InP, among many others. The non-linear interaction is represented by the non-linear susceptibility tensor $\chi^{(2)}$, which has non-zero elements $\chi^{(2)}_{ijk}$ only for the elements $\chi^{(2)}_{xyz}$, $\chi^{(2)}_{yzx}$, and $\chi^{(2)}_{zxy}$. The non-linear interaction produces a non-linear polarization $$P_i^{\omega'} = \chi^{(2)}_{ijk} E_j^\omega E_k^{\omega P} \quad (8)$$

This polarization at a frequency different from the two electric fields drives the electric field at $\omega'$ according to $$\frac{dE_i^{\omega'}}{dz} = -i\omega' \sqrt{\frac{\mu_o}{\epsilon_o}} \chi^{(2)}_{ijk} E_j^\omega E_k^{\omega p} e^{i\Delta k \cdot z}.$$

This equation integrates to $$E_i^{\omega'}(L) = -i\omega' \sqrt{\frac{\mu_o}{\epsilon_o}} \chi^{(2)}_{ijk} E_j^\omega E_k^{\omega p} \frac{e^{i\Delta k \cdot L} - 1}{i\Delta k} + E_i^{\omega'}(0).$$

Consider now a zinc-blende crystal oriented [0,0,1] in the upward direction and a waveguide extending from the [1,−1,0] facet to the [−1,1,0] facet. Also, assume that both optical electrical fields $E_{\omega P}$ and $E_\omega$ are polarized along the [1,1,0] direction in the plane of the crystal and perpendicular to the waveguide. When these electrical fields are decomposed into their cartesian coordinates, the tensor relationship produces, taking advantage of the symmetry $\chi^{(2)}_{zxy} = \chi^{(2)}_{zyx}$, an expression for the growth of the generated wave $$E_i^{\omega'}(L) = -i\omega' \sqrt{\frac{\mu_o}{\epsilon_o}} \chi^{(2)}_{zxy} |E^\omega| |E^{\omega p}| \frac{e^{i\Delta k \cdot L} - 1}{i\Delta k}$$

When the interaction extends over a coherence length $L = \Lambda_c$ this expression reduces to $$E_i^{\omega'}(\Lambda_c) = \frac{2\omega' \Lambda_c}{\pi} \sqrt{\frac{\mu_o}{\epsilon_o}} \chi^{(2)}_{zxy} |E^\omega| |E^{\omega p}|.$$

If the crystal is now rotated to the [0,0,−1] orientation, the z-coordinate is inverted and the x- and y-coordinates are exchanged. Following through the above procedure for the new orientation produces and taking into account the inversion of the z-coordinate, $$E_i^{\omega'}(\Lambda_c) = -\frac{2\omega' \Lambda_c}{\pi} \sqrt{\frac{\mu_o}{\epsilon_o}} \chi^{(2)}_{zxy} |E^\omega| |E^{\omega p}|.$$

However, the change of sign must be compared with the fact that the electric fields have changed their phase in the successive coherence lengths. As a result, in the two successive crystallographically inverted regions, the generated wave has energy added to it with the same phase.

In the first detailed embodiment to be described with reference to FIGS. 4 and 5, the ridge waveguide 40 is composed of the III–V semiconductor AlGaAs. Solid state lasers are very well known and are usually composed of families of related III–V semiconductor compounds. The waveguide of this embodiment is composed of AlGaAs because of its strong optical non-linearities in the 1.5-µm band. This semiconductor is a particularly good material for non-linear optical waveguides because it has a relatively large non-linear optical tensor element of $\chi^{(2)}_{36} = 180$ pm/V and has the further advantage of relatively easy integration with semiconductor opto-electronic devices. Table 1 gives the effective refractive indices of the AlGaAs waveguide 40 of FIG. 5 at various wavelengths for both the TE and TM polarizations.

TABLE I

| λ (μm) | TE | TM |
|---|---|---|
| 0.7700 | 3.397918 | 3.265502 |
| 1.5200 | 3.152134 | 3.150860 |
| 1.5400 | 3.149980 | 3.148682 |
| 1.5605 | 3.147844 | 3.146523 |

This embodiment relies on a bulk AlGaAs ridge waveguide 40 formed on a [001]-oriented GaAs substrate 42 and extending in the [011] direction. This crystal orientation provides good non-linear conversion. The ridge waveguide 40 is 3 μm wide and optically confines the light. It includes a pair of $Al_{0.5}Ga_{0.5}As$ cladding layers 54 and 56 of 2-μm thickness sandwiching an $Al_{0.5}Ga_{0.3}As$ core layer 58 of 1.5-μm thickness. Such a structure and the other semiconductor structures of the invention can be grown by molecular beam epitaxy (MBE) among other growth techniques. The initial embodiments are not electrically biased so the layers 54, 56, and 58 are preferably undoped and semi-insulating. The coherence length for the desired wavelength conversion is 1.55 μm so that each of the two sections 44 and 46 have that length. The waveguide length is 3.5 mm, which achieves a conversion efficiency of 30% with a bandwidth of 40 nm.

The required asymmetry can be achieved in a number of different ways. For example, the two sections 44 and 46 can be made to have opposite crystal orientation in the zinc-blende crystallography of the III–V semiconductors.

Figure 6:
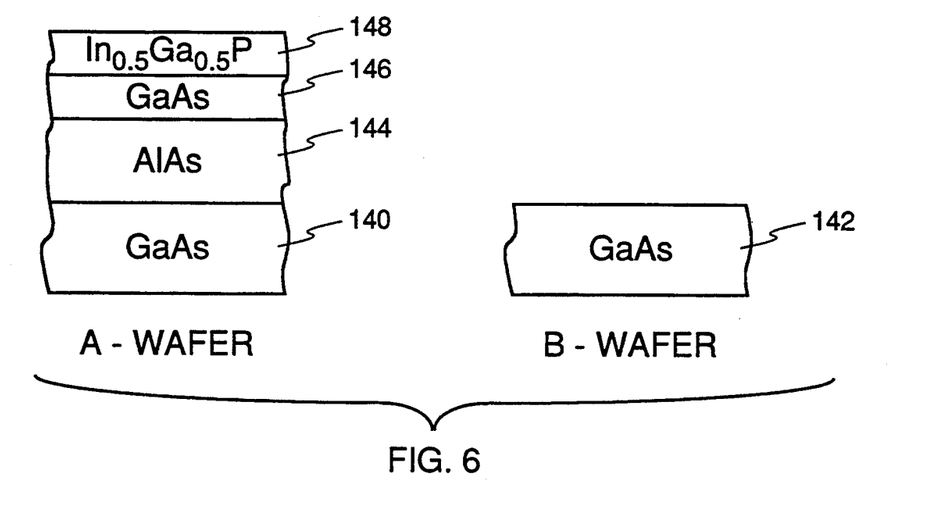
Figure 7:
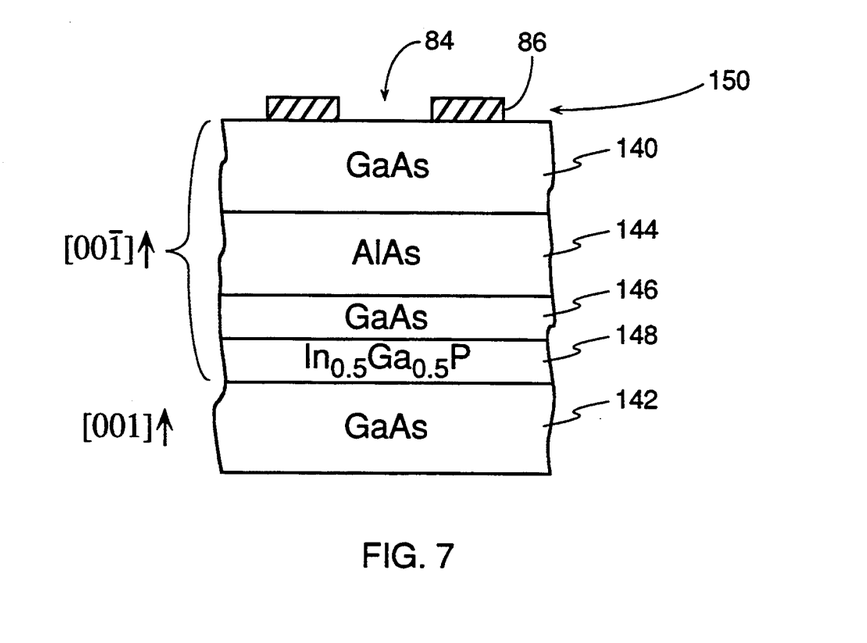

Rajaram Bhat and I have developed one method of forming a waveguide with longitudinally inverted crystallographic domains which depends on fusing together two substrates. As illustrated in cross section in FIG. 6, two GaAs wafers 140 and 142 both have a same [001] orientation, where the [0,0,1] orientation is to be distinguished from the [0,0,−1] orientation. The A-wafer 140 is epitaxially deposited with a 3-μm etch stop layer 144 of AlAs, a 10-nm layer 146 of GaAs, and a 20-nm layer 148 of $In_{0.5}Ga_{0.5}P$. The A-wafer 140 is then rotated and, as illustrated in FIG. 7, bonded to the top of the B-wafer 142 so that their common [001] crystallographic axes face each other. That is, the B-wafer 142 has a [001] orientation while the A-wafer 140 has a [0,0,−1] orientation. The difference results from the asymmetry of the zinc-blende structure relative to the tetrahedral silicon structure. The bonding may be performed by atomic rearrangement, as has been described by Bhat et at. in U.S. Pat. No. 5,207,864.

Figure 8:
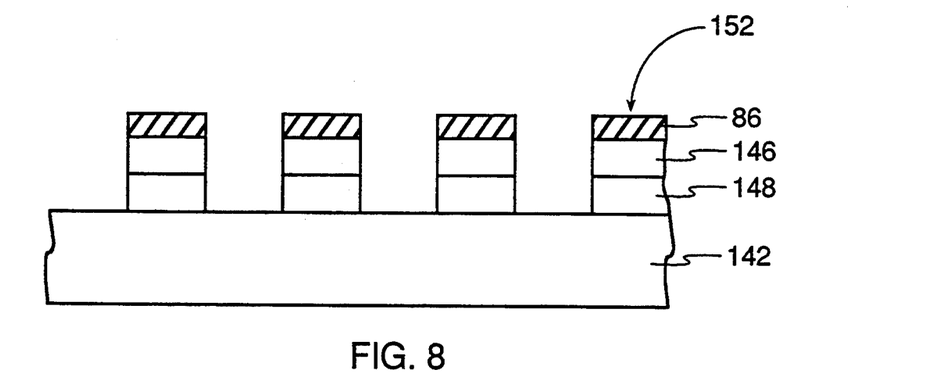
Figure 9:
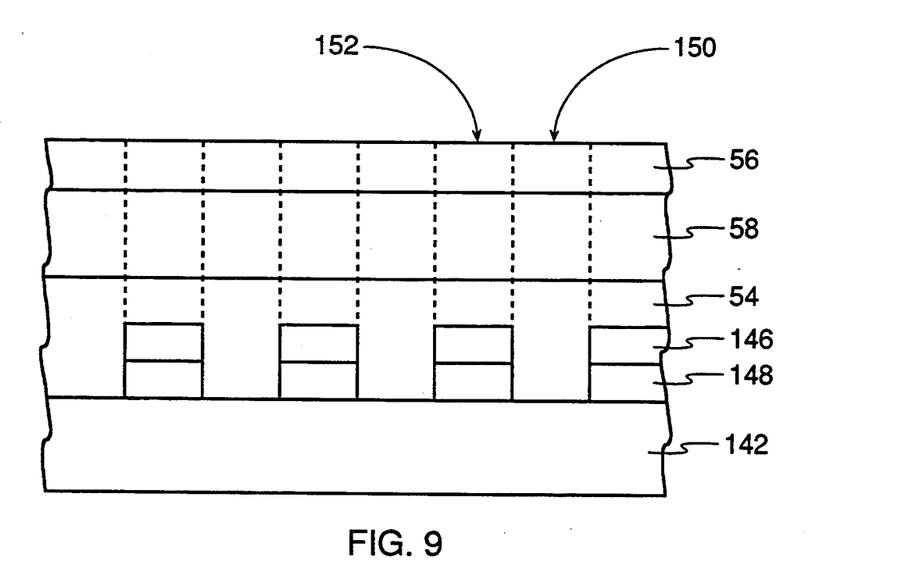

Sequential selective wet etching then removes both the upper GaAs substrate 140 and the AlAs etch-stop layer 144. Then, a photoresist mask 150 is patterned over the upper GaAs layer 140. The developed mask 150 has apertures 84 and masked areas 86. The structure is etched selectively for the thin GaAs 146 and then for the $In_{0.5}Ga_{0.5}P$ layer 148, leaving mesas 152, shown in cross section in FIG. 8. Thereafter, as shown in cross section in FIG. 9, after the masked areas 86 are removed, there are sequentially grown the epitaxial lower $Al_{0.5}Ga_{0.5}As$ cladding layer 54, the core $Al_{0.3}Ga_{0.7}As$ layer 58, and the upper $Al_{0.5}Ga_{0.5}As$ layer 56. However, because of the different underlying crystallographies, the overlying layers form into [0,0,1] regions 150 and [0,0,−1] regions 152, or vice versa.

Similar results can be obtained using the method of Christopher Palmstrom involving metallic masks, followed by etching and directional deposition. The metal may be the epitaxial metal ErAs.

In another method of modulating the crystallographic domains, the first sections 44 are disordered by a masked ion implantation so as to destroy in the first sections 44 the crystalline asymmetry with which $\chi^{(2)}$ is associated while the second sections 46 retain their zinc-blende crystalline orientation with the attendant non-linearity. This fabrication process will be described later with respect to another embodiment.

Figure 10:
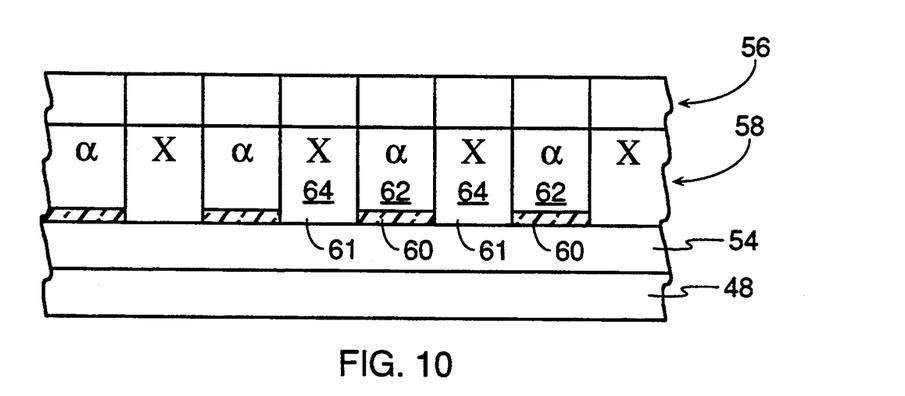
FIG. 10 is a longitudinal cross-sectional view of a waveguide deposited as alternating amorphous and crystalline regions.

Another method of fabricating the longitudinally asymmetric structure follows the method suggested by James Harris of Stanford. As shown in the longitudinal cross section of FIG. 10, after the lower cladding layer 54 of $Al_{0.5}Ga_{0.5}As$ is grown on the GaAs substrate 42, a series of 10-nm thick $SiO_2$ masks 60 are photolithographically patterned on the lower cladding layer 54. Both the masks 60 and the intervening apertures 61 extend longitudinally along the optical waveguide for one coherence length $\Lambda_c$. The $SiO_2$ masks 60 are amorphous while the AlGaAs exposed at the bottom of the apertures 61 is crystalline. Thereafter, the core layer 58 of $Al_{0.3}Ga_{0.7}As$ is grown by MBE. However, because of the different amorphous and crystalline surfaces on which it is formed, the core layer 58 grows as alternate amorphous regions (a) 62 and crystalline regions (X) 64. Thereby, this fabrication process provides alternating regions of a coherence length of non-linear crystalline regions 64 and substantially linear amorphous regions 62. Thereafter, the upper cladding layer of $Al_{0.5}Ga_{0.5}As$ is grown. It too exhibits alternating amorphous and crystalline regions, but since it is primarily used for its linear characteristics of confining the light to the core layer 58 the asymmetry is not crucial. It is pointed out that the amorphous regions 62 of the core layer 58 tend to swell by about 1% relative to the crystalline regions 64, which tends to increase the scattering loss along the waveguide.

Figure 5:
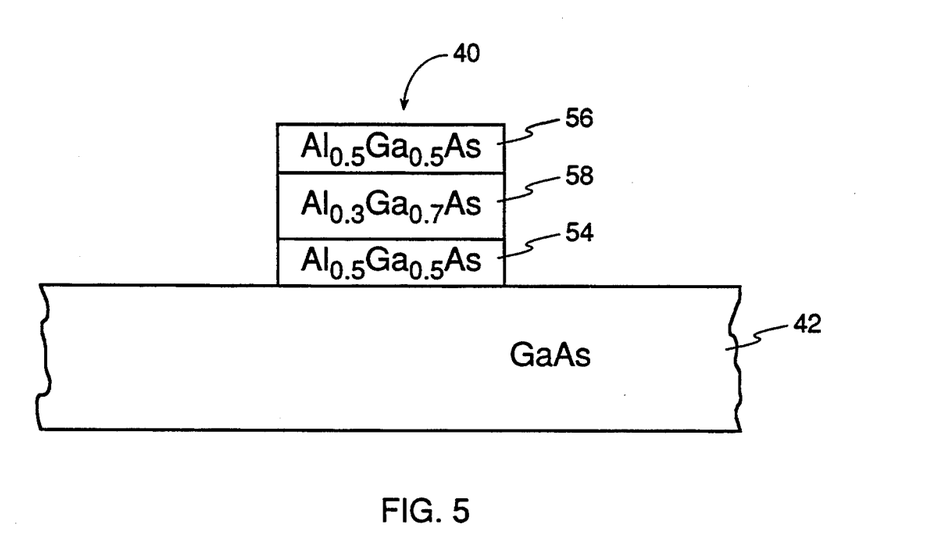
FIG. 5 is a cross-sectional view of a detailed embodiment of the ridge waveguide of FIG. 4.
Figure 11:
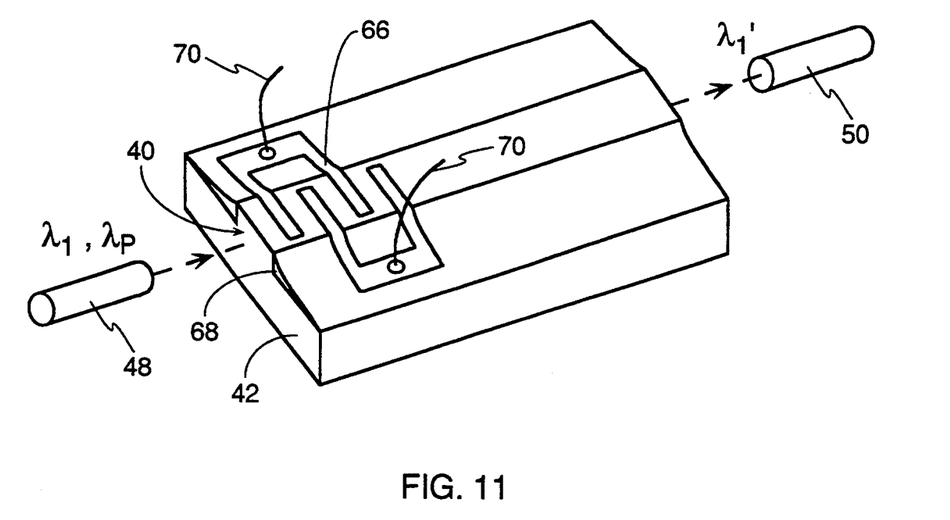
FIG. 11 is an isometric view of another embodiment of the wavelength converter of the invention using a transducer electrically driving a semiconductor ridge waveguide.

Another embodiment illustrated isometrically in FIG. 11 includes an AlGaAs ridge waveguide 40 of the same general lateral cross-section as illustrated in FIG. 5. However, since AlGaAs is a piezo-optic as well as piezo-electric material, the asymmetric sections are actively and dynamically formed by an electrically driven acoustic transducer 66 deposited on the top of the ridge 40 and extending over of an insulating, planarizing layer 68 of, for example, polyimide or a lattice matched insulating III–V semiconductor with a lower refractive index than $Al_{0.3}Ga_{0.7}As$. An RF electrical generator is connected to the transducer 66 through a matching circuit and electrical leads 70. Cheung et al. have described the use of transducers in lithium niobate waveguides in U.S. Pat. No. 5,002,349. The length of the waveguide 62 is 1 cm. The transducer has a period of 3.1 μm and is driven by an RF signal having a frequency of 960 MHz. It thus excites acoustic waves and attendant non-linear variations of the optical susceptibility in the waveguide 40. The dynamic use of transducers has the advantage that the asymmetry can be tuned by varying the RF frequency applied to the transducer 66. The conversion efficiency will be high for interacting waves whose phase matching condition is determined by the acoustic frequency. Hence, the wavelength converter can select the input wavelength value for efficient conversion. In addition, varying both the RF frequency and the optical pump wavelength will control the value of the output wavelength $\lambda'_1$ for a given input wavelength $\lambda_1$.

Figure 12:
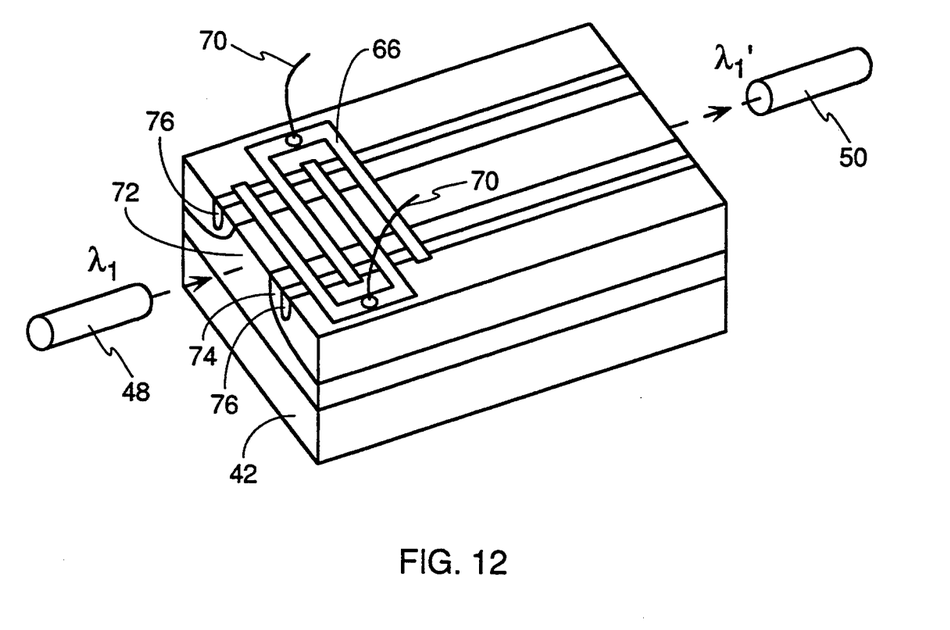
FIG. 12 is an isometric view of an embodiment closely related to that of FIG. 11 and including a buried optical waveguide and an acoustic waveguide.

An alterative embodiment closely related to that of FIG. 11 is illustrated isometrically in FIG. 12. A buried AlGaAs waveguide 72 having the general vertical compositional structure shown for the ridge waveguide 40 of FIG. 5 is formed over the GaAs substrate 42 and is laterally surrounded by low-index regions 74 of, for example, $Al_{0.5}Ga_{0.5}As$. Such a structure is well known for buried heterostructure semiconductor lasers. The low-index regions 74 are planarized with the top of the buried waveguide 72 so that the transducer 66 can be easily deposited thereover. Advantageously, trenches 76 of semi-insulating GaAs are formed in the low-index regions 74 well outside of the buried waveguide 72 to confine the acoustic wave generated by the transducer. That is, both optical and acoustic waveguides are formed.

Quantum wells are known to produce highly efficient semiconductor lasers. A quantum-well contains an active layer that is very thin and is sandwiched between two buffer layers. The electronic bands of the layers are such that the quantum well has a very high density of electronic states. The quantum well's high optical activity is due to its highly non-linear mechanisms. The non-linearity is greatly increased in the present application when the optical pump resonates with the quantum-well transition, that is, when the optical pump energy $\omega_p$ equals the difference between the energy of lowest quantum-well states in the valence and conduction bands.

Figure 13:
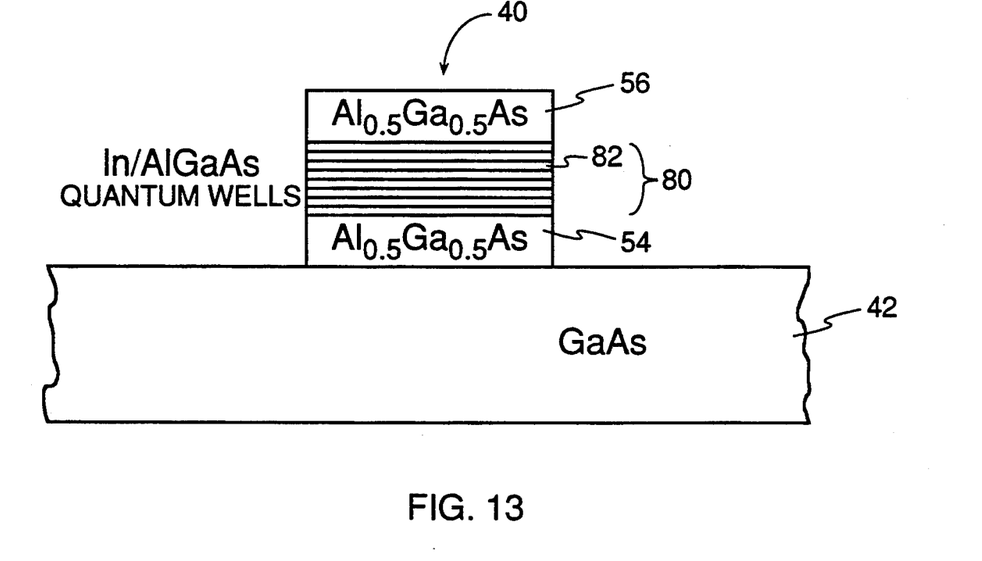
FIG. 13 is a lateral cross-sectional view of a detailed embodiment of the wavelength converter of the invention using a passive quantum-well waveguide.
Figure 14:
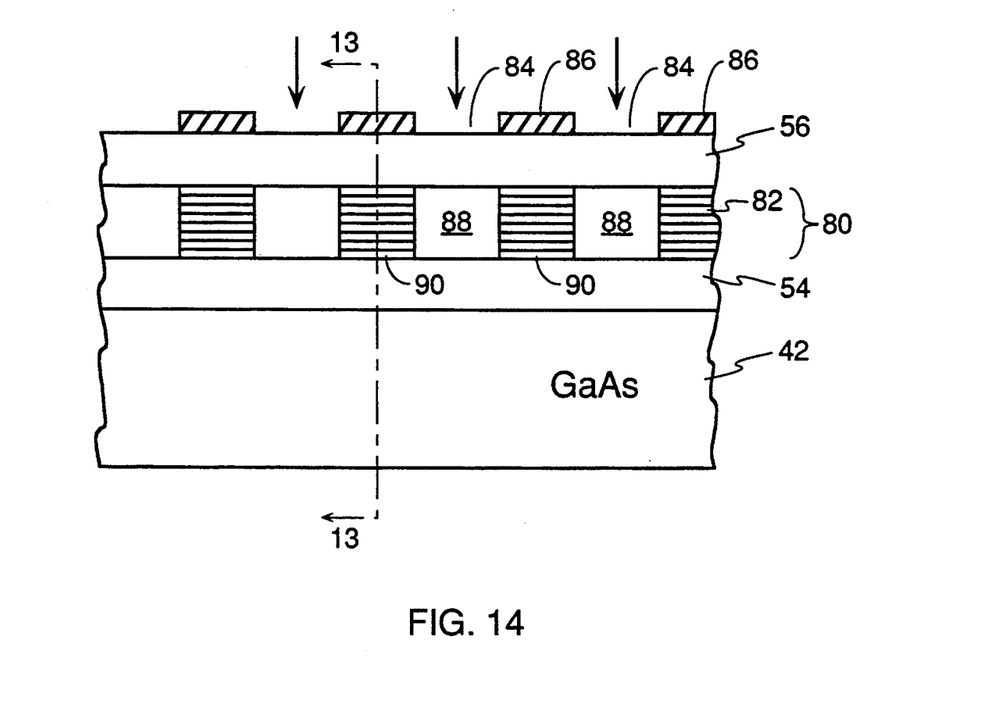
FIG. 14 is a longitudinal cross-sectional view of one type of the waveguide of FIG. 13.

A passive quantum-well embodiment of the invention has the general structure illustrated isometrically in FIG. 4 and has lateral and longitudinal cross-sections illustrated respectively in FIGS. 13 and 14. The 2-μm $Al_{0.5}Ga_{0.5}As$ cladding layers 54 and 56 sandwich a quantum-well core layer 80 including 80 periods of a quantum-well structure 82. The layers 54, 56, and 80 are formed into a 3-μm wide ridge waveguide 40, and in this passive embodiment are undoped semi-insulators. Three alternatives for the passive quantum-well structure 82 are presented below. The coherence length is 1.55 μm, and the length of the waveguide 40 is 3.5 mm. Quasi phase matching can be achieved by patterning a photoresist mask over the upper barrier layer 56 with alternating apertures 84 and mask areas 86, each of length equal to the coherence length $\Lambda_c$. The energy of the ion implantation is chosen such that the ions stop in the quantum-well layer 80 and greatly disorders it in disordered regions 88. However, the mask areas 86 prevent the quantum-well regions 82 from becoming similarly disordered. A subsequent anneal returns the disordered regions 88 to a good crystalline semiconductor, but the superlattice structure has been destroyed along with the associated non-linearities. The result is an alternating, asymmetric structure of highly non-linear passive quantum-well regions 90 and substantially linear bulk crystalline regions 88. Yoo et al. have described this process in "Second-order susceptibility in asymmetric quantum wells and its control by proton bombardment," *Applied Physics Letters*, vol. 58, 1991, pp. 1724–1726.

Figure 15:
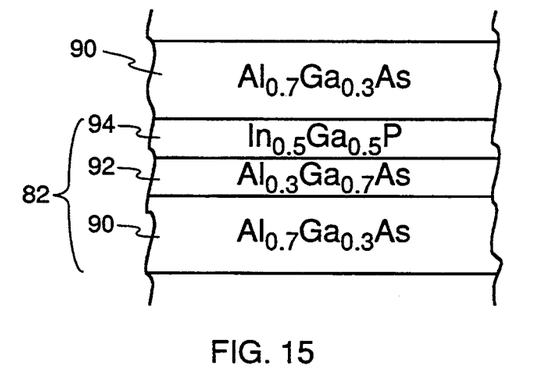
FIGS. 15, 17, 19, and 26 are cross-sectional views of quantum-well structures useful with different embodiments of the invention.
Figure 16:
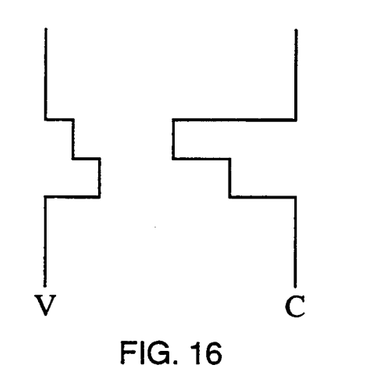
FIGS. 16, 18, 20, and 27 are energy band diagrams associated with the quantum-well structures of FIGS. 15, 17, 19, and 26.

A first embodiment of the passive quantum-well structure 82 is illustrated in cross-section in FIG. 15, and its energy band structure for its valence band V and conduction band C is illustrated schematically in FIG. 16. Each period 82 of the superlattice includes a 10-nm thick barrier 90 of $Al_{0.7}Ga_{0.3}As$, a 5-nm thick quantum well 92 of $Al_{0.3}Ga_{0.7}As$, and a 5-nm thick step well 94 of $In_{0.5}Ga_{0.5}P$. All these layers are at least approximately lattice matched to the GaAs substrate 42.

Figure 17:
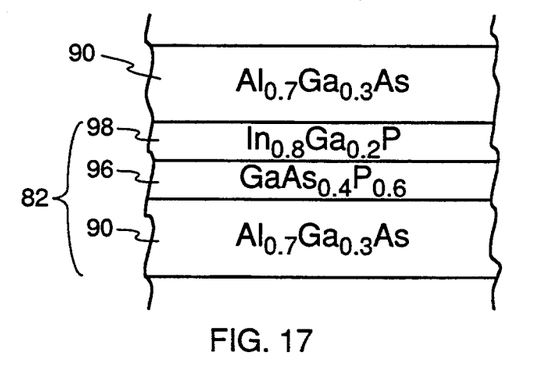
Figure 18:
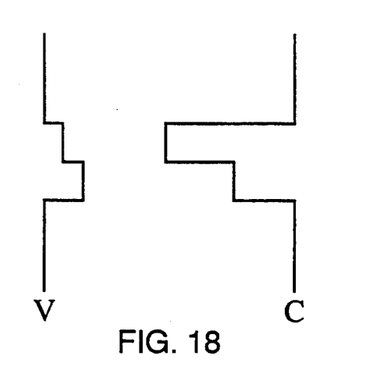

A second embodiment of the passive quantum-well structure 82 is illustrated in cross-section in FIG. 17 and its energy band structure in FIG. 18. Each period 82 includes the 10-nm barrier 90 of $Al_{0.7}Ga_{0.3}As$, a 5-nm thick quantum well 96 of $GaAs_{0.4}P_{0.6}$, and a 5-nm thick step well 98 of $In_{0.8}Ga_{0.2}P$. Because of their compositions relative to the GaAs substrate 42, the quantum well 96 is under 2% biaxially tensile strain, and the step well 98 is under 2% biaxially compressive strain. Both their thicknesses are small enough so as to pseudomorphic; that is, they are epitaxial to the underlying material on which they are grown and do not slip to their natural lattice constants.

Figure 19:
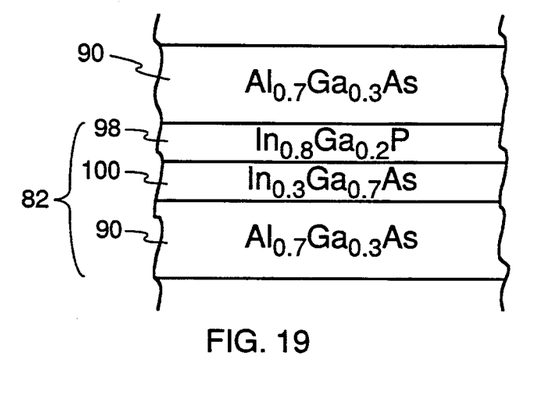
Figure 20:
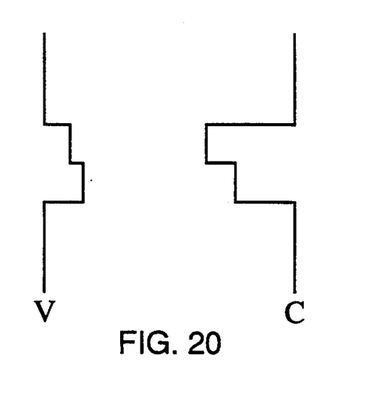

A third embodiment of the passive quantum-well structure 82 is illustrated in cross-section in FIG. 19 and its energy band structure in FIG. 20. Each period 82 includes the 10-nm barrier 90 of $Al_{0.7}Ga_{0.3}As$, a 5-nm thick quantum well 100 of $In_{0.3}Ga_{0.7}As$, and the 5-nm thick step well 98 of $In_{0.8}Ga_{0.2}P$. The quantum well 100 is under 2% biaxially tensile strain, and the step well 98 is under 2% biaxially compressive strain, and both are of pseudomorphic thickness.

All three designs have a large optical non-linearity, but their gain is relatively small, an unimportant factor for a passive structure. The first design has only a compositional asymmetry while the second and third additionally have large strain asymmetries, with a large non-linearity introduced by a 4% change in strain over a distance less than 20 nm. The quantum-well structures 82 of FIGS. 15, 17, and 19 are appropriate for the passive quantum-well waveguide of FIG. 11.

Figure 21:
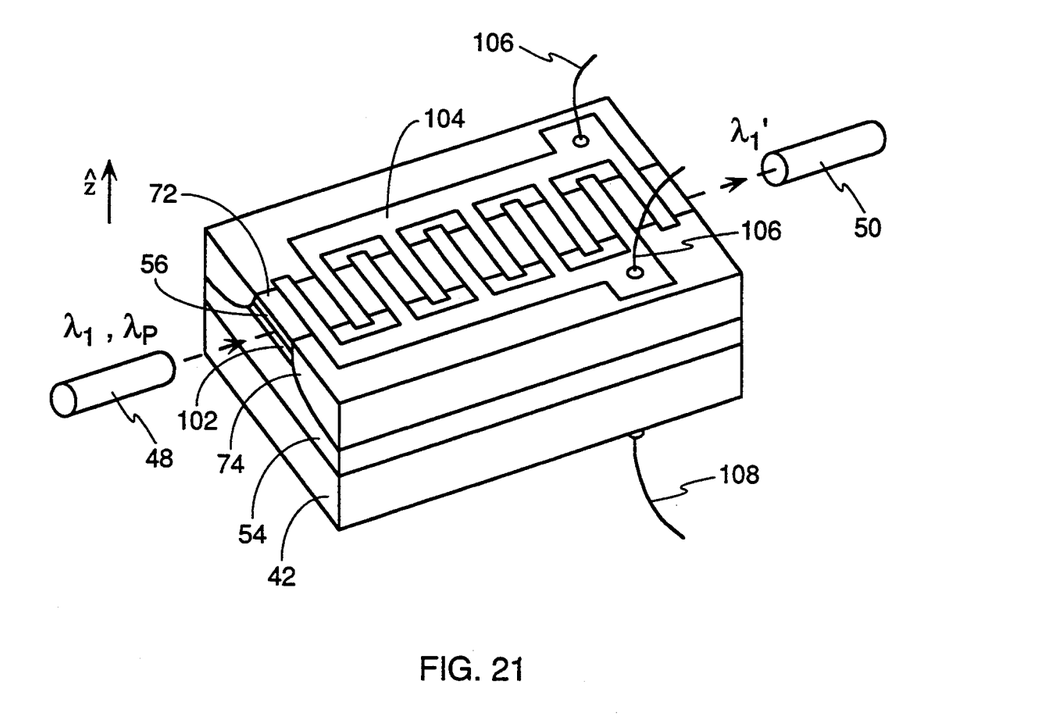
FIG. 21 is an isometric view of a wavelength converter of the invention that is bias modulated from a DC electrical source.
Figure 22:
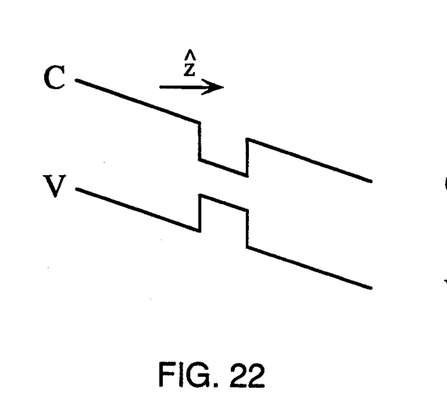
FIGS. 22 and 23 are electronic band structures associated with the bias modulated wavelength converter of FIG. 21.
Figure 23:
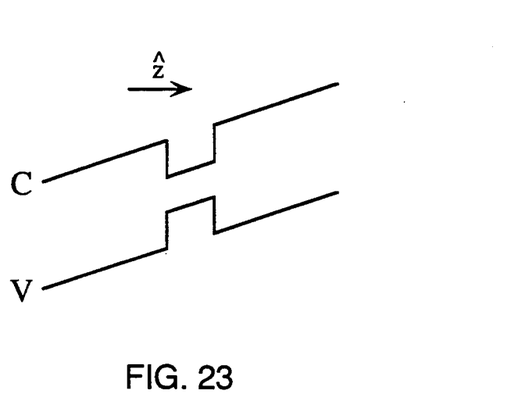

The passive quantum-well waveguide can be electrically DC modulated as illustrated isometrically in FIG. 21. A buried waveguide 72 is formed similarly to that of FIG. 12 but it includes the cladding layers 54 and 56 of FIG. 5 sandwiching a passive quantum-well layer 102 of a large number of preferably symmetric quantum wells. It has a length of 3.5 mm. A pair of extended interdigitated electrodes 104 are formed over nearly the full length of the buried waveguide 72 and over the planarizing regions 74. The full period of the interdigitated electrodes 104 is twice the coherence length $\Lambda_c$, that is, a full period of 3.1 μm. The finger width should be minimized but is lithographically limited to about 1 μm. A DC voltage is applied across the interdigitated electrodes 104 from a DC voltage source through electrical connections 106. The $n^+$ GaAs substrate 42 is grounded through another electrical connection 108 so that it is at a potential between the two voltages applied to the two interdigitated electrodes 92. The biasing causes a vertical DC electrical field in the z-direction to be applied to the quantum-well layer 102 and the polarity of the field changes every coherence length. As a result of the alternation of vertical biasing, beneath one interdigitated electrode 104 the band structure around a quantum-well is shown in FIG. 22 while the band structure beneath the other interdigitated electrode 104 is shown in FIG. 23. That is, the electrical field $E_z$ in the z-direction has opposite polarity in the two regions. An electrical field produces a non-linear susceptibility $\chi^{(2)}$ that is proportional to $E_z$ so that the non-linear susceptibility has equal magnitudes but opposite signs every coherence length. Accordingly, the structure allows a quasi phase matched interaction between the three optical frequencies. Of course, the DC electrical field may have a slow AC modulation and still be effectively DC as long as the AC modulation does not launch a travelling acoustic wave in the optical waveguide.

Figure 24:
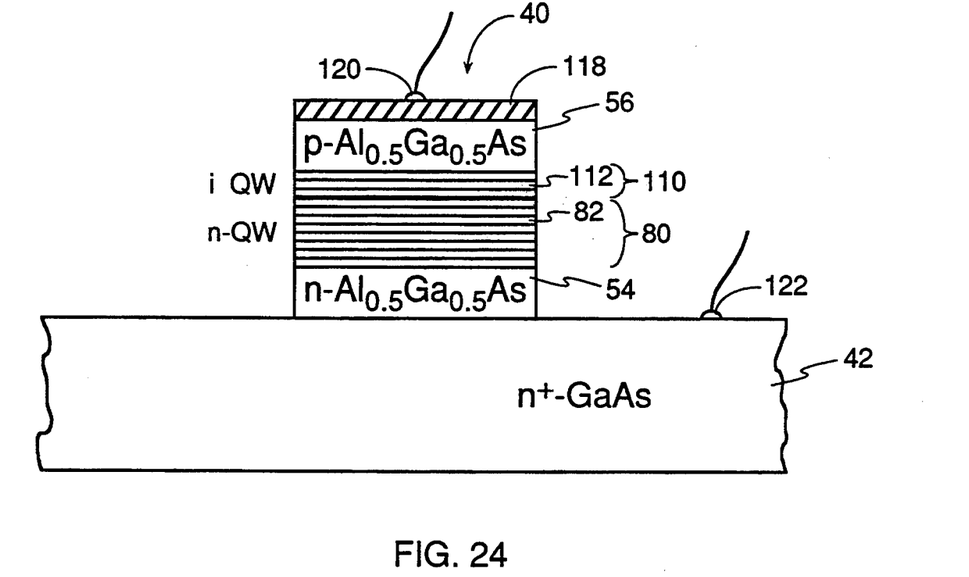
FIG. 24 is a lateral cross-sectional view of a detailed embodiment of the invention using an active quantum-well waveguide.
Figure 25:
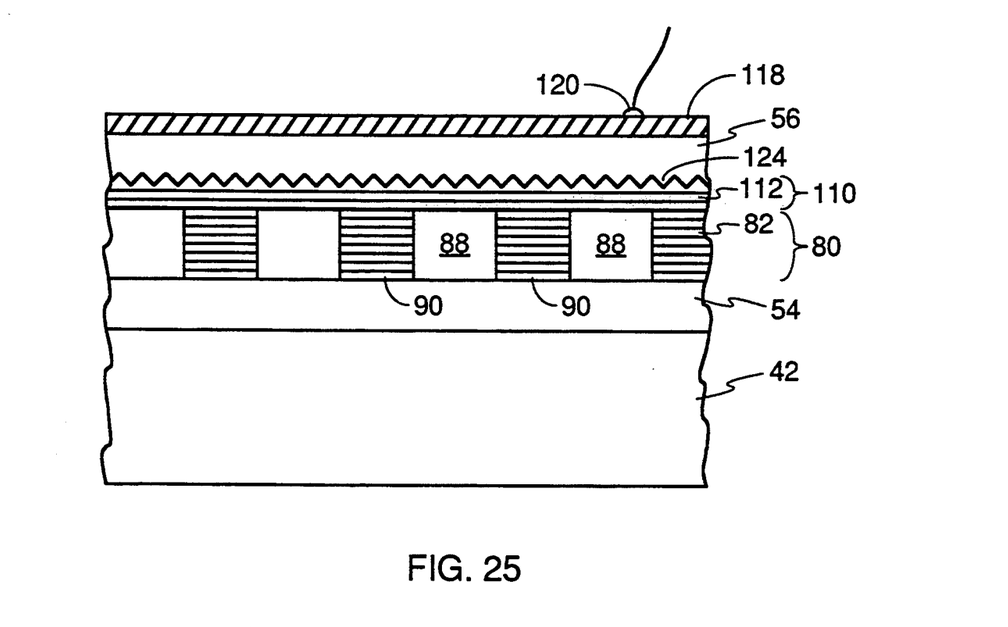
FIG. 25 is longitudinal cross-section view of a type of the waveguide of FIG. 24.

An embodiment of the invention incorporating an active quantum-well waveguide is illustrated in lateral and longitudinal cross sections in FIGS. 24 and 25 respectively. The 2-μm thick lower cladding layer 54 of Al$_{0.5}$Ga$_{0.5}$As is grown on an n$^+$-type GaAs substrate 42 and is grown n$^+$-type to be highly conducting. The passive quantum-well layer 80 includes 80 periods of the quantum-well structure 82 of either FIGS. 15, 17, or 19, and the entire passive quantum-well layer 80 is grown n-type. Over the passive quantum-well layer 80 is grown an active quantum-well layer 110 of three periods of an active quantum-well structure 112, which is grown undoped.

Figure 26:
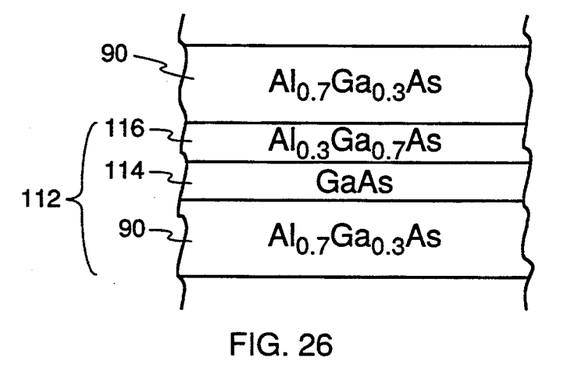
Figure 27:
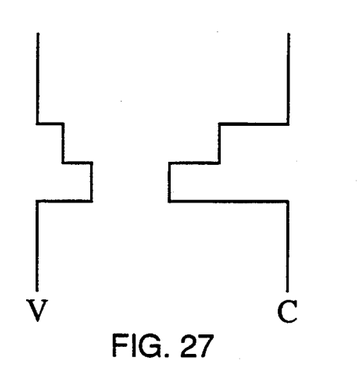

The active quantum-well structure 112 is illustrated in cross-section in FIG. 26 and its energy band structure in FIG. 27. Each period 112 of the superlattice includes the 10-nm thick barrier 90 of Al$_{0.7}$Ga$_{0.3}$As, a 3-nm thick quantum well 114 of GaAs, and a 5-nm thick step well 116 of Al$_{0.3}$Ga$_{0.7}$As. All the layers are lattice matched to the GaAs substrate. Also, all these layers are grown intrinsic so that the quantum-well structure 112 acts as the active lasing region. This active quantum-well structure 112 has a large gain at 0.77 μm and a somewhat smaller optical non-linearity than the designs presented before for the passive quantum-well structures. This design depends upon only compositional asymmetry. This quantum-well structure 112 is not recommended for use as the quantum-well structure 82 of FIG. 13.

Returning to FIGS. 24 and 25, the 2-μm thick upper cladding layer 56 of Al$_{0.5}$Ga$_{0.5}$As is grown over the active quantum-well layer 110 and is grown p-type. The upper barrier layer 56 is covered by a metallization 118. The layers are formed into the 3-μm wide ridge waveguide 40. The coherence length for wavelength conversion is 1.55 μm, and the length of the waveguide 40 is 3.5 mm. Phase matching is achieved by ion implanting every other coherence length and thereafter annealing so as to homogenize the quantum wells in the ion implanted regions. Preferably, the homogenized regions 88 of the passive quantum-well layer 82 are selectively subjected to implantation before the active quantum-well layer 110 is grown. Then, the active quantum-well layer 110 is grown over it and left longitudinally uniform so as to maximize the optical gain. Electrical contacts 120 and 122 are attached to the metallization 118 and to the substrate 42. Electrical forward biasing of the resultant diode structure causes the active quantum-well layer 110 to lase at a wavelength of the pump wavelength $\lambda_P$ near 0.77 μm. High but not perfect reflectors at 0.77 microns are applied to both facets. It has been found that similar quantum-well structures lase spontaneously in a single mode without a frequency-determining grating or other similar means. However, a structurally integrated distributed Bragg reflector (DBR) provides tight control over the lasing pump wavelength. Such a DBR has a period of about 120 nm compared to the 6-μm coherence length and can be a continuous corrugation 124 between the active quantum-well layer 110 and the upper cladding layer 56, as is well known for quantum-well lasers. The active lasing of the pump signal eliminates the need to input the pump signal into the wavelength converter.

The embodiments of FIGS. 11 and 13 can be combined. The passive quantum-well waveguide 40 of FIG. 13 is formed, but no structural asymmetry is produced. Instead, the transducer 66 of FIG. 11 having a 3.1-μm period is formed over the semiconductor waveguide 40. A waveguide length of 1 cm produces the desired conversion efficiency. The transducer dynamically generates asymmetric non-linearities.

The embodiments of FIGS. 11 and 24 can be combined. The active quantum-well waveguide 40 of FIG. 24 is formed without any structural longitudinal asymmetry. The 3.1-μm period transducer 66 of FIG. 11 is formed over one end of the 1-cm long waveguide 40 with an insulating layer between it and the metallization 112.

The invention can also be applied to the perovskite, metal oxide materials LiTaO$_3$ and LiNbO$_3$. These materials have non-zero non-linear susceptibility tensor elements only for $\chi^{(2)}_{zzz}$, $\chi^{(2)}_{zxx}$, and $\chi^{(2)}_{xxz} = \chi^{(2)}_{xzx} = \chi^{(2)}_{yyy}$. As illustrated isometrically in FIG. 28, proton exchange is used to form a waveguide 130 extending along the y-direction in a substrate 132 of x-cut or z-cut LiTaO$_3$ or LiNbO$_3$. Wong describes this process in "Integrated optical waveguides and devices fabricated proton exchange: a review," *Integrated Optical Circuit Engineering VI*, SPIE vol. 993, 1993, pp. 13–26. For both substrate orientations, the optical signals are polarized along the z-direction. Table 2 lists the room-temperature bulk refractive indices for the ordinary and extraordinary rays in LiNbO$_3$.

TABLE 2

| λ (μm) | $n_o$ | $n_e$ |
|---|---|---|
| 0.7700 | 2.260660 | 2.172323 |
| 1.5200 | 2.213718 | 2.132529 |
| 1.5400 | 2.213026 | 2.131944 |
| 1.5605 | 2.212324 | 2.131351 |

Figure 28:
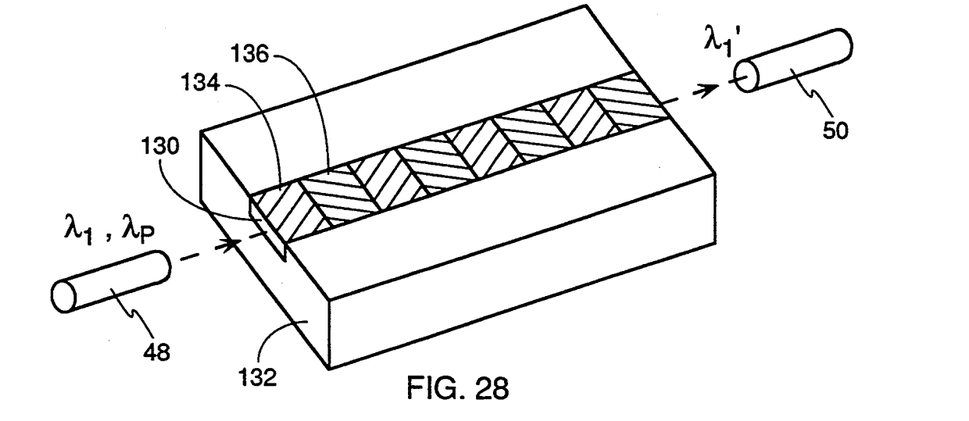
FIG. 28 is an isometric view of a detailed embodiment of the invention using domain reversal in a waveguide formed in a perovskite substrate.

The waveguide has a width of 6 μm, a depth of 4 μm, and a length of 3 mm. The material has a coherence length of 9.5 μm for the non-linear optical interaction. The asymmetric first and second sections 134 and 136 have reversed crystallographic domains every coherence length and are formed by proton exchange followed by rapid thermal annealing. The first anneal for the waveguide definition is done at a higher temperature than the later anneal for homogenizing the superlattices, as has been described by Yamamore who discloses domain inversion in "Characteristics of periodically domain-inverted LiNbO$_3$ and LiTaO$_3$ waveguides for second harmonic generation," *Applied Physics Letters*, vol. 70, 1991, pp. 1947–1951 and in "Milliwatt-order blue-light generation in a periodically domain-inverted LiTaO$_3$ waveguide," *Optics Letters*, vol. 16, 1991, pp. 1156–1158.

Hermann et at. discloses non-linear processes in such waveguides in "Difference-frequency generation of tunable, coherent mid-infrared radiation in Ti:LiNbO$_3$ channel waveguides," *Journal Optical Society of America B*, vol. 5, 1988, pp. 278–284. Lim et al. have disclosed the use of such waveguides for frequency mixing in "Infrared radiation generated by quasi-phase-matched difference-frequency mixing in a periodically poled lithium niobate waveguide," *Applied Physics Letters*, vol. 59, 1991, pp. 2207–2209. Uesugi et al. have disclosed parametric amplification in such waveguides in "Parametric difference frequency generation in three-dimensional LiNbO$_3$ optical waveguide," *Applied Physics Letters*, vol. 36, 1980, pp. 178–180. Soblet et al. have disclosed similar results in "Optical parametric amplification in Ti-diffused LiNbO$_3$ waveguides, *Applied Physics*

*Letters*, 1980, pp. 255–257. Matsumoto et al. have disclosed frequency doubling in LiTaO$_3$ in "Quasiphase-matched second harmonic generation of blue light in electrically periodically-poled lithium tantalate waveguides," *Electronics Letters*, vol. 27, 1991, pp. 2040–2041. Mizuuchi et al. have disclosed frequency doubling in LiTaO$_3$ in "Second-harmonic generation of blue light in LiTaO$_3$ waveguides, *Applied Physics Letters*, vol. 58, 1991, pp. 2732–2734.

Figure 29:
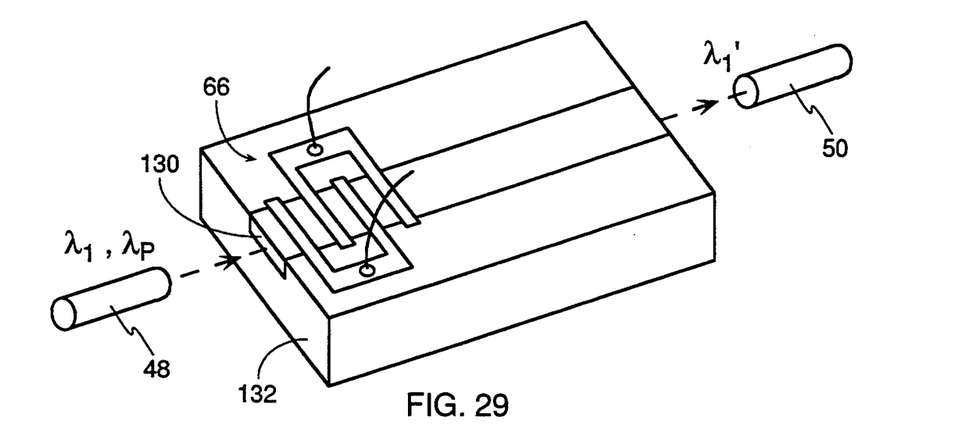
FIG. 29 is an isometric view of a detailed embodiment of the invention using an acoustic transducer over an optical waveguide formed in a perovskite substrate.

A dynamic embodiment of a perovskite, metal oxide wavelength converter is illustrated isometrically in FIG. 29 and resembles the polarization converter disclosed in the Cheung et al. patent. The waveguide 130 is formed in the substrate 132, but is not differentiated longitudinally. Instead the transducer 66 of FIG. 11 is formed over one end of the waveguide 130 to excite acoustic waves propagating co-linearly with the optical waveguide 130. For lithium niobate, the transducer has a period of 19 μm. The length of the waveguide 130 determines the resolution of the wavelength selectivity. A 3.5-cm long LiNbO$_3$ waveguide has a resolution of 0.5 nm.

It is known that Ti-doped LiNbO$_3$ can lase. Thus, it is possible to optically pump a Ti-doped LiNbO$_3$ waveguide receiving an optical input signal and convert it to another frequency.

Lithium niobate waveguide are known to be able to lase when they are doped with titanium and then are optically pumped. Such a waveguide has obvious advantages for the present invention.

The above described embodiments have included a large number of different elements. Although many of these elements have been individually available in the prior art, the different combinations of these elements presented here exhibit numerous advantages. These elements can be combined in a number of different combinations than those explicitly described.

A number of interactions are feasible. For example, the invention can act as a channel shift in 1.3-μm or in 1.5-μm WDM networks. It can also be used as an interconnection between 1.3-μm and 1.5-μm WDM networks.

The above embodiments have described the conversion of only one frequency. Of course, multiple frequencies can be input and simultaneously converted. However, since the pump frequency determines the frequency shift, the channels in these simple embodiments cannot be individually and selectively converted to another frequency. Many such frequency converters can be set up in parallel between neighboring WDM networks. The multiple outputs of the converters can be easily combined by fusing optical fibers and the like. The multiple WDM frequencies input to the interface can be separated by prisms, diffraction gratings, or the acousto-optical converters described by Cheung et al.

The invention thus provides a simple but effective means of converting an optical signal from one frequency to another. Although the invention has been justified in terms of a WDM communications system, it is not so limited but may be applied to other applications.

What is claimed is:

1. A wavelength converter comprising an optical waveguide formed in a substate and having a plurality of sequential, periodic sets of regions of differing non-linear optical susceptibility to at least partially quasi phase match an interaction between a first optical signal at a first optical frequency, a second optical signal at a second optical frequency, and a third optical signal at a third optical frequency, said optical waveguide comprising an active optically lasing region lasing at said first optical frequency, whereby said first optical signal acts as a pumping signal to convert said second optical signal to said third optical signal.

2. A wavelength converter comprising an optical waveguide formed in a substrate and an acoustic transducer formed over said waveguide, an acoustic wave produced by said transducer producing a plurality of sequential, periodic sets of regions of differing non-linear optical susceptibility to at least partially quasi phase match an interaction between a first optical signal at a first optical frequency, a second optical signal at a second optical frequency, and a third optical signal at a third optical frequency, whereby said first optical signal acts as a pumping signal to convert said second optical signal to said third optical signal.

3. A wavelength converter comprising an optical waveguide formed in a substrate and having a plurality of sequential, periodic sets of regions of differing non-linear optical susceptibility to at least partially quasi phase match an interaction between a first optical signal at a first optical frequency, a second optical signal at a second optical frequency, and a third optical signal at a third optical frequency, said regions having differing respective crystalline structures, whereby said first optical signal acts as a pumping signal to convert said second optical signal to said third optical signal.

4. A wavelength converter as recited in claim 3, wherein a first one of said regions has an asymmetric crystalline structure and a second one of said regions is disordered.

5. A wavelength converter as recited in claim 3, wherein said regions have a common crystalline structure but aligned in different directions.

6. A wavelength converter comprising an optical waveguide formed in a substrate and having a plurality of sequential, periodic sets of regions of differing non-linear optical susceptibility to at least partially quasi phase match an interaction between a first optical signal at a first optical frequency, a second optical signal at a second optical frequency, and a third optical signal at a third optical frequency, said waveguide being formed of a semiconductor and comprising at least one quantum well, whereby said first optical signal acts as a pumping signal to convert said second optical signal to said third optical signal.

7. A wavelength converter as recited in claim 6, at least some of said at least one quantum wells comprise a first quantum-well portion in compressive strain adjacent to a second quantum-well portion in tensile strain.

8. A wavelength converter as recited in claim 6, wherein said regions comprise alternating regions of said at least one quantum well and of a semiconductor not defined into a quantum-well structure.

9. A wavelength converter as recited in claim 6, wherein said waveguide comprises a plurality of passive quantum wells.

10. A wavelength converter as recited in claim 9, wherein said plurality of passive quantum wells are doped and wherein said waveguide further comprises an active layer comprising at least one quantum well and two cladding layers of opposite conductivity types sandwiching said plurality of passive quantum wells and said active layer.

11. A communications network, comprising:

a first wavelength-division multiplexed network comprising multiple communication paths carrying a plurality of data signals impressed upon a plurality of optical carrier signals at respective first optical carrier frequencies;

a second wavelength-division multiplexed network comprising multiple communication paths carrying a plurality of data signals impressed upon a plurality of optical carrier signals at respective second optical carrier frequencies; and a wavelength converter at an interface between said first and second wavelength-division multiplexed networks comprising an optical waveguide formed in a substrate and having a plurality of sequential, periodic sets of regions of differing non-linear optical susceptibility to at least partially quasi phase match an interaction between a first optical signal at one of said first optical frequencies, a second optical signal at one of said second optical frequencies, and a third optical signal at a third optical frequency, whereby said third optical signal acts as a pumping signal to convert said first optical signal to said second optical signal.

12. A network as recited in claim 11, wherein said waveguide comprises at least one semiconductor quantum well.

13. A network as recited in claim 11, wherein each of said regions has a length substantially equal to a coherence length between said first, second, and third optical frequencies.

14. A network as recited in claim 11, wherein said waveguide comprises a metal oxide material having an anistropic crystal structure.

15. A network as recited in claim 11 further comprising:

a pair of interdigitated electrodes set over said optical waveguide and biased by an effectively DC signal to apply an alternating electrical field to said regions.

* * * * *